(12) United States Patent
Blitz et al.

(10) Patent No.: US 11,050,790 B2
(45) Date of Patent: *Jun. 29, 2021

(54) INDEPENDENT ENCRYPTION COMPLIANCE VERIFICATION SYSTEM

(71) Applicant: Alertsec Inc., Leesburg, VA (US)

(72) Inventors: Ebba Ulrika Margareta Blitz, Palo Alto, CA (US); Leif Olov Billstrom, Alno (SE); Kurt Uno Lennartsson, San Jose, CA (US); Hans Fredrik Loevstedt, Palo Alto, CA (US); Erik Magnus Ahlberg, Newmarket (GB)

(73) Assignee: Alertsec, Inc., Leesburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,583

(22) Filed: May 11, 2020

(65) Prior Publication Data
US 2020/0344263 A1 Oct. 29, 2020

Related U.S. Application Data

(63) Continuation of application No. 15/462,895, filed on Mar. 19, 2017, now Pat. No. 10,652,279, which is a continuation-in-part of application No. 15/298,192, filed on Oct. 19, 2016, now Pat. No. 10,860,723.

(60) Provisional application No. 62/465,665, filed on Mar. 1, 2017, provisional application No. 62/379,188, filed on Aug. 24, 2016.

(51) Int. Cl.
*H04L 29/06* (2006.01)
*G06F 21/60* (2013.01)

(52) U.S. Cl.
CPC ............ *H04L 63/20* (2013.01); *G06F 21/602* (2013.01); *H04L 63/10* (2013.01)

(58) Field of Classification Search
CPC ....... G06F 21/30; G06F 21/577; H04L 63/20; H04L 63/205
See application file for complete search history.

(56) References Cited

U.S. PATENT DOCUMENTS

| | | | |
|---|---|---|---|
| 9,288,199 B1 | 3/2016 | Winn et al. | |
| 2005/0204041 A1 | 9/2005 | Blinn et al. | |
| 2005/0273850 A1 | 12/2005 | Freund | |
| 2010/0008500 A1 | 1/2010 | Lisanke et al. | |
| 2014/0068273 A1 | 3/2014 | Sobel et al. | |
| 2015/0302045 A1 | 10/2015 | Czamy et al. | |
| 2016/0285911 A1 | 9/2016 | Goldman et al. | |

(Continued)

OTHER PUBLICATIONS

European Patent Office Extended European Search Report (EESR) including Search Opinion dated Mar. 21, 2019. (8 pages).
Office Action, CA App. No. 3033308, dated Mar. 3, 2021, 4 pages.

*Primary Examiner* — Ellen Tran
(74) *Attorney, Agent, or Firm* — Nicholson De Vos Webster & Elliott LLP; Judith Szepesi

(57) ABSTRACT

A compliance checker to verify that a device complies with a policy is described. In one embodiment, the compliance checker comprises a compliance checker agent, to initiate the compliance check, in response to receiving the request, and an encryption checker to obtain an original data and a data stored on the storage. The system further comprising a comparator to determine whether known data read from the upper driver is identical to known data read from the lower driver. The compliance checker plug-in in one embodiment verifies the compliance status of the device, based on the data from the comparator.

20 Claims, 18 Drawing Sheets

(56) References Cited

U.S. PATENT DOCUMENTS

2017/0373848 A1   12/2017   Osaki
2018/0293180 A1   10/2018   Czarny et al.
2018/0352003 A1   12/2018   Czarny et al.

INDEPENDENT ENCRYPTION COMPLIANCE VERIFICATION SYSTEM

RELATED APPLICATIONS

The present application is a continuation of U.S. patent application Ser. No. 15/462,895 filed on Mar. 19, 2017, which is a continuation-in-part of U.S. patent application Ser. No. 15/298,192, filed on Oct. 19, 2016, which claims priority to U.S. Provisional Application No. 62/379,188, filed on Aug. 24, 2016. The present application also claims priority to U.S. Provisional Application No. 62/465,665, filed on Mar. 1, 2017. The present application incorporates these prior art applications by reference in their entirety.

FIELD

The present invention relates to encryption, and more particularly to an encryption compliance verification system.

BACKGROUND

With ever increasing cyber security threats and incidents of serious security breaches, it is important for businesses and organizations to protect sensitive data. Because such sensitive data is often stored on computers used within the organization and accessed from/stored on devices external to the organization boundaries, ensuring that the data is secure in both can be problematic. In many industries such protection is also mandated by law and/or stringent compliance requirements. Encrypting data at rest (end-to-end) and maintaining audit log of users accessing the secured data/systems are major components in many compliance requirements.

The use of Full Disk Encryption (FDE) and Full Volume Encryption (FVE) are well-known technologies to secure data at rest on a computer's hard drives and partitions (i.e. volumes) in such a way that all data stored is always encrypted. There are many different ways to implement this type of encryption.

While forcing each user internally and externally to use the same computer operating system and same encryption mechanism is possible in theory, in practice it becomes very difficult, especially when operating systems, vendors, devices, types and versions vary.

Currently, compliance with policies is enforced mainly by requiring every user to fill out a survey in which he or she indicates whether they comply with the policy requirements. This is obviously insecure, and can easily be filled out incorrectly, whether purposefully or accidentally.

Alternatively compliance can be enforced within an organization by supplying devices with specific software, or by requiring the use of a specific software or module on all devices. However, this approach cannot verify compliance when different vendors, devices, and different solutions are used.

Alternatively, the business may simply permit users to bring their own devices (BYOD) without device management. However, this path requires giving up compliance requirements, and decreasing security of the network.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1:
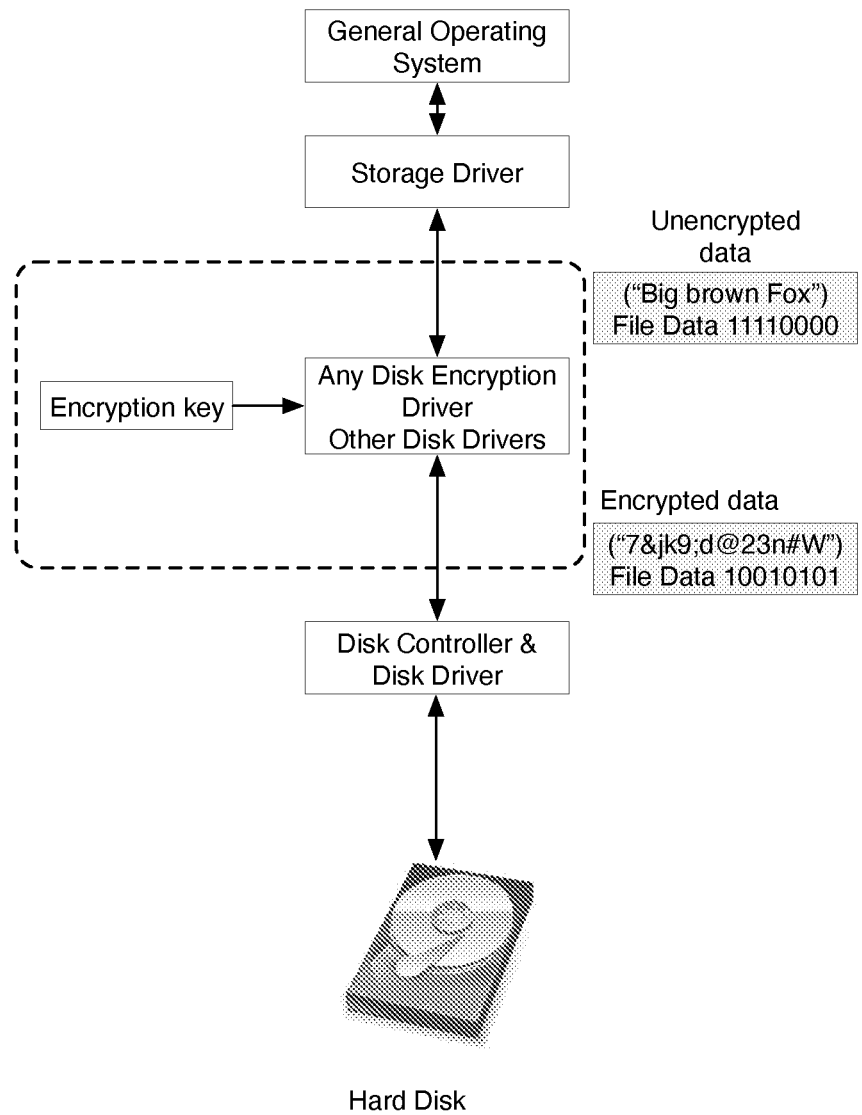
FIG. 1 is a diagram of a prior art disk system, with an encryption driver.

The Compliance Check System (CCS) described in this document implements a general Compliance Check and Verification mechanism to ensure that computers that access a restricted or protected Web Application/Portal/Data comply with the requirements of that portal. In one embodiment, for devices accessing a Web Application/Portal/Data requiring data-at-rest encryption is verified for compliance by verifying that it has adequate encryption installed and active. In one embodiment, the system validates complete device encryption. In one embodiment, the CCS tests for encryption compliance on the end point before allowing access to sensitive data. Other types of compliance, including the use of an appropriate operating system, operating system update status, compliance agent update status, the use of a sufficiently strong password, etc. may also be enforced by the Compliance Check System.

In one embodiment, the encryption compliance check is encryption application neutral, and performed as a service by a subscription service (Compliance Check System Subscription (CCSS)) each time a user requests access to sensitive data/area on a protected web site/etc. This architecture allows the code on a Partners Site to be minimal while the check on service provider systems can be advanced and check for different types of compliance (starting in this system with checking for encryption compliance).

For example, a web/cloud application may need assurance that the remote system that requests a download of data has disk encryption. However, to make the web application viable to a large group of customers it cannot employ a checking system that only offers checking for one single product. What is needed is a system that can check for and confirm fully encrypted disk—independent of the encryption vendor. This is what the CCS system provides.

In one embodiment, for some operating systems the system interacts with the driver stack for the storage device. It adds one "compliance" driver above (upper driver) and one "compliance" driver below (lower driver) the encryption driver that is doing encryption/decryption of data to and from the disk. Then, known data is sent to or read from the disk and captured by both drivers, in one embodiment. In one embodiment, the known data is pre-stored data used for compliance checking only. The known data is not customer or confidential data. The two compliance drivers communicate with each other (bypassing the encryption driver) and compare the results. If the data sent and received is identical, then the disk is not encrypted but if the data is not identical then the data is encrypted. In one embodiment, the system can perform a simple analysis on the encryption to determine that it is reasonable, and not merely scrambling or compression.

In one embodiment, for some operating systems the system does not include any direct drivers but rather uses the drivers for the operating system, to store data on the hard drive. The system then directly reads the data from the storage/drive, using the data mapping, using a low level device driver to access the data. It then does the comparison to see if the data is encrypted.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 2A:
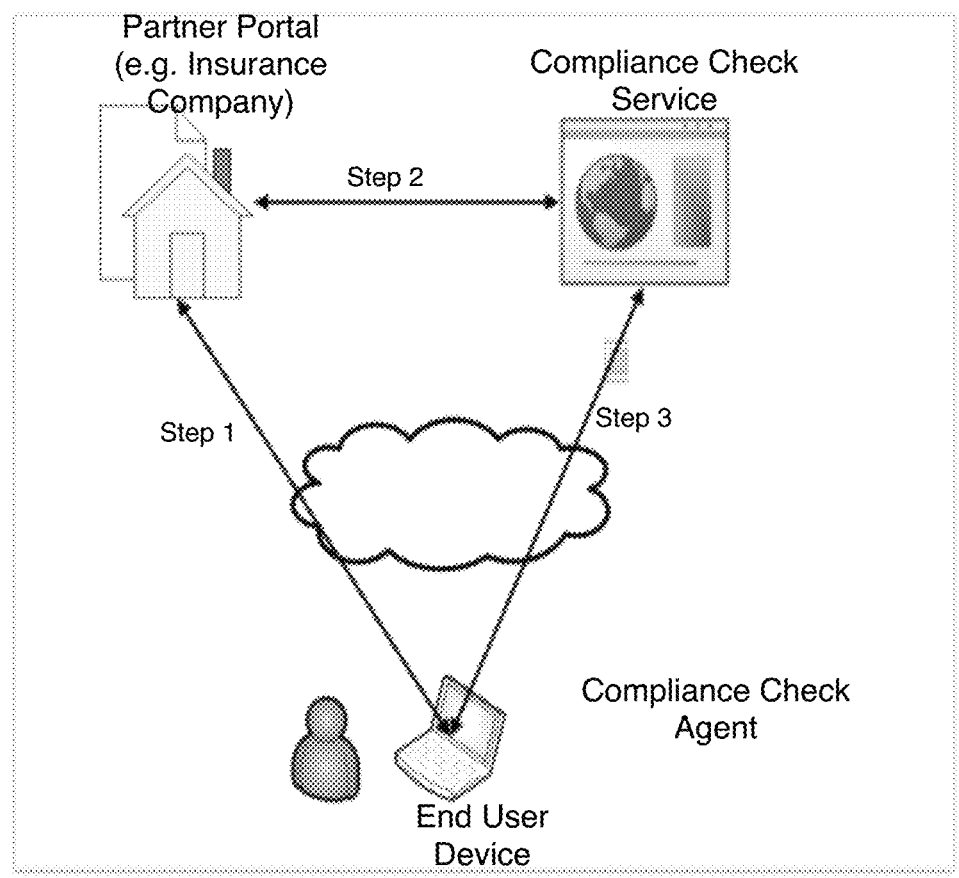
FIG. 2A is an overview diagram of one embodiment of the system.

FIG. 2A is an overview diagram of one embodiment of the system. The Compliance Check System's (CCS), in one embodiment, consists of a Web based service 110 and a User computer portion 240. The Web part 210 of the system consists of two parts, an enforcement checker 220 that in one embodiment provides a yes/no check located at each partner/subscriber web application/portal and the actual compliance verification system 230 running at the compliance check provider (CCS).

Figure 2B:
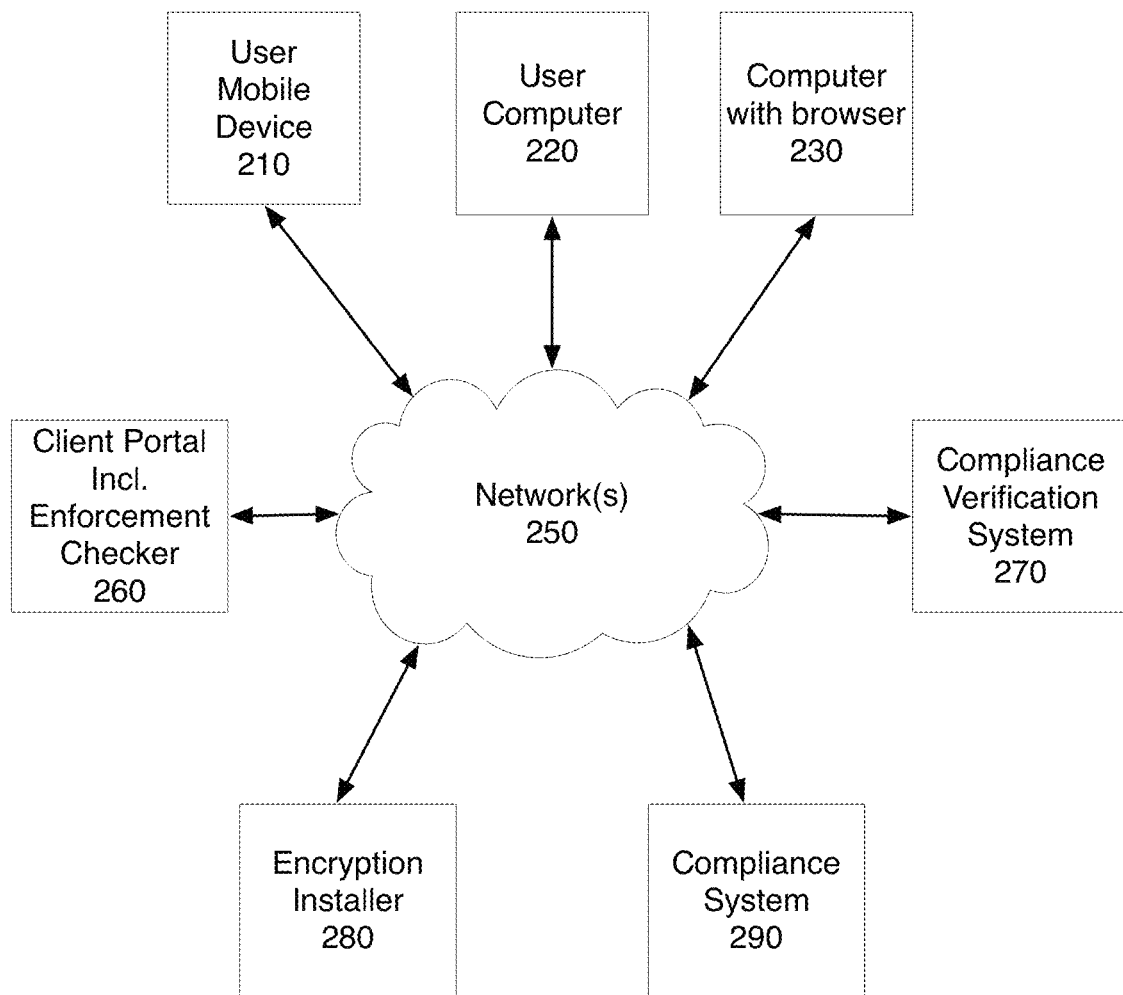
FIG. 2B is a block diagram of one embodiment of the elements of the system.

FIG. 2B is a more detailed block diagram of the elements of the CCS, in one embodiment. The user device, which may be a mobile device 210, computer running an application 220, or computer with a browser 230, connects via network 150 to a portal 160. The portal is 260 the client system through which a user system 210, 220, 230 attempts to access secure data, or content.

The portal 260 in one embodiment includes an enforcement checker, which verifies whether the device has already verified its compliance with the policies. In one embodiment a secure cookie may be used for this verification. If the device is not already verified, the user device is redirected to the compliance verification system 270, which installs compliance verification software if needed, and verifies compliance status. In one embodiment, the compliance verification system 270 may also be able to install software or reconfigure the user's system 210, 220, 230, or redirect the user to a provider of software, to create compliance.

In one embodiment, the compliance verification system 270 checks for disk encryption compliance. In one embodiment, other compliance checks such as checking for anti-virus/anti-spyware presence and update status can also be provided by this system. In one embodiment, specific compliance policies may be defined by the portal/partner. In that case, compliance verification system 270 verifies the requested set of compliance policies, when a request is made to the check a user's system. This allows for partner portal to remain the same even when additional checks are requested to be performed by the compliance checking system 170.

In one embodiment, the compliance verification system 270 may direct the user to encryption installer 280, or Compliance system 290, if the user device 210, 220, 230 fails the compliance verification. This enables the user to obtain the necessary applications to comply with the requirements of the portal 260.

User System Architecture

Figure 3:
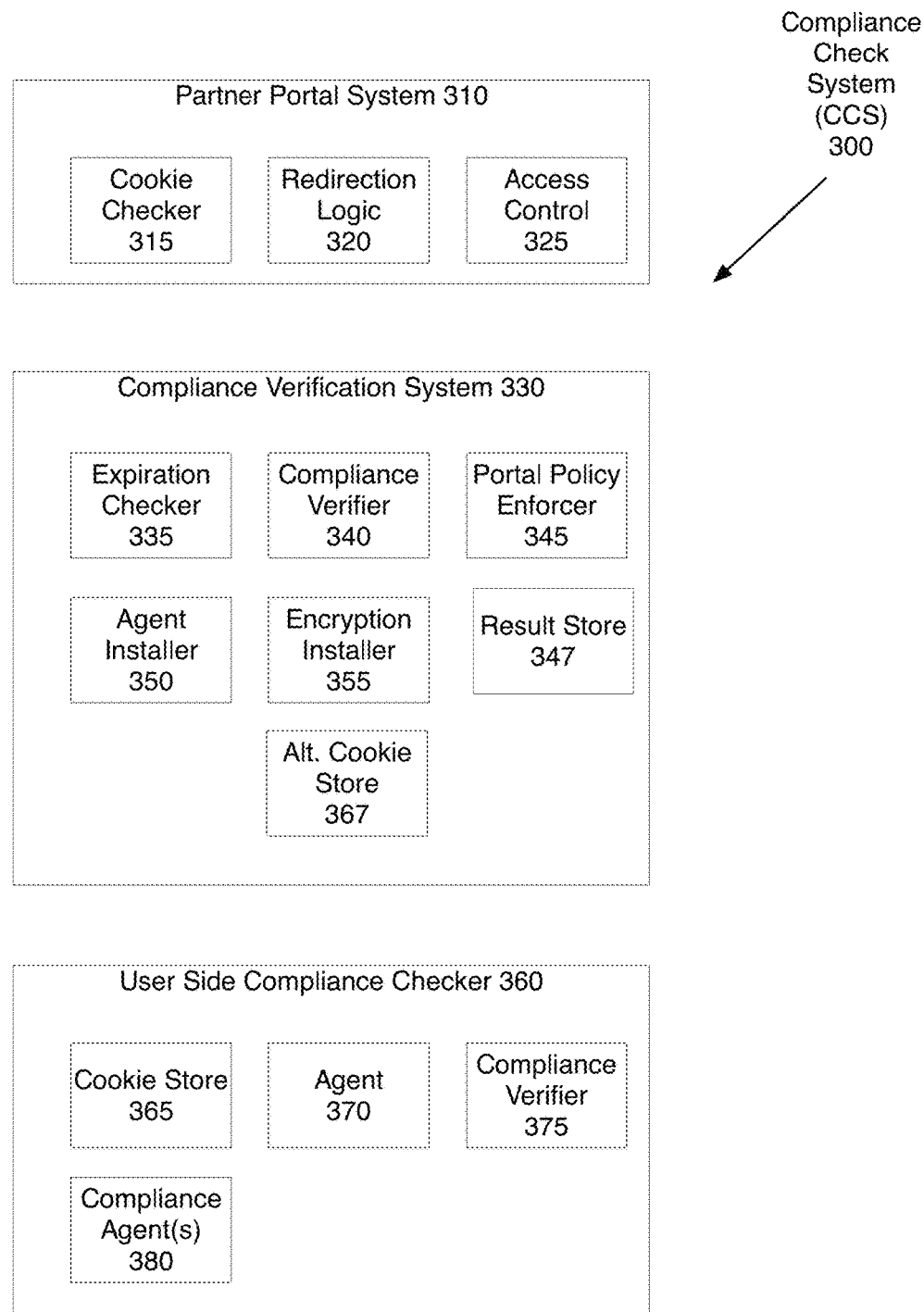
FIG. 3 is a block diagram illustrating one embodiment of the elements of the compliance check system.

FIG. 3 is a block diagram illustrating one embodiment of the elements of the compliance check system. Users' system may be a computing system with various operating systems such as Windows, Linux and Mac OS. In one embodiment, a mobile system may be used, such as Android, iOS, and Windows 10. The user system is designed to have a compliance checker 360. If the Partner portal system 310 finds that the CSS 360 is not installed on the user's system, it prompts the user to install the user agent that works with the OS. In one embodiment, the user agent 370 works with browsers such as Chrome, Internet Explorer, Firefox and Safari, which may be used to access the partner portal. In one embodiment the browser may only be involved during download for install. After install, the agent 370 may communicate directly with the partner website and the CCS. In one embodiment, the user side compliance checker 360 is browser agnostic.

On Windows, in one embodiment, the detection is based on a method of storing and reading data to determine whether data is encrypted when stored on the disk. In one embodiment, on Mac OS X, the OS provided internal encryption system is queried to verify encryption status. Other methods of verifying compliance may be utilized. In one embodiment a compliance agent 380 provides the OS/system specific compliance verification.

Compliance Verification System 330 implements a framework, which enables Customers/Partners 310 to perform compliance checks on any user system using user-side compliance checker 360. Such a check may be performed whenever the user requests access to sensitive data from the Partner, at intervals, upon request by the Customers/Partners, or based on one or more other factors. Access control 325 triggers such a compliance check, in one embodiment. In one embodiment, the partner portal system 310 may verify whether a valid compliance cookie 315 exists. Cookie, in this context refers to any verification code which indicates that the compliance status of user device has been previously validated. In one embodiment, cookie checker 315 may include an expiration checker. In another embodiment, the expiration may be checked by expiration checker 335 in the compliance verifications system 330.

In one embodiment, the CCS provides a small PHP class (code snippet used on PHP based Websites) with generic code to be deployed at Partner Portal as a stub 320, which is called when Partner Portal system 310 wants to carry out a Compliance check. This stub, redirection logic 320, redirects the user system from the partner portal system 310 to the CCS provider system 330. In another embodiment, the Partner Portal system 310 may perform an initial validation check, to see if the user device is previously validated, and redirect the user only when the user is not already validated.

The CCS performs the compliance verification by compliance verifier 340 checking with compliance verifier 375 on User local system 360 using various methods depending on the OS and Browser on the User System. In one embodiment an updatable database may contain a set of parameters used for alternative detection methods, parameters individualized per product to detect, or for checking if a function is enabled by checking for specific directory content, specific active services and/or registry/config settings. In one embodiment, the presence of certain applications, with associated active services, configuration files, etc. indicates that the disk is encrypted. In one embodiment, the system may also include data about non-compliant or inadequate encryption applications, and may fail a system for utilizing such an application. In one embodiment, the CCS provider system records information about CCS requests and results and other parameters in result store 347. These records can be used for auditing purpose, as well as for billing purposes.

In one embodiment, portal policy enforcer 345 enforces the security policies of the Partner Portal system 310. Such policies may include not only disk encryption but also operating system upgrades, malware checkers, and other policies. In one embodiment, agent installer 350 installs agents appropriate to enable compliance checking, for the portal policies. In one embodiment, the compliance verification system 330 may include an encryption installer 355, to install the user side compliance checker 360. In another embodiment, that element maybe on a different site, and the user system 363 may be redirected to that site.

The user side compliance checker 360 may include a cookie store 365 to store cookies verifying prior compliance checks. In one embodiment, if the user device cannot include a cookie store 365, an alternative cookie store 367 on the compliance verification system 330 may store the cookie, and metadata identifying the user device, and its current state. One or more compliance agents 380 are used to verify compliance with the portal policy. Compliance verifier interacts with the compliance verification system 330.

Figure 4:
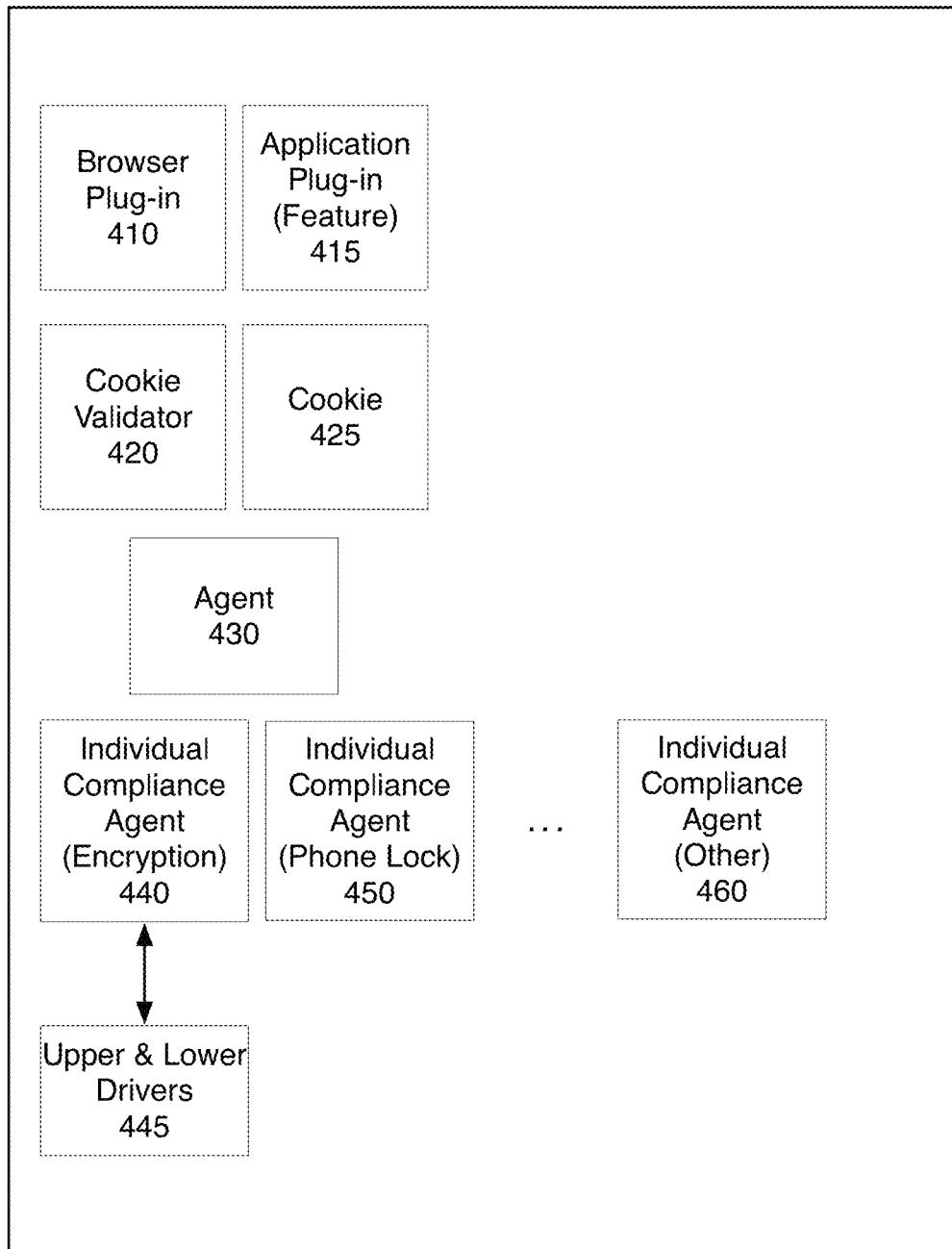
FIG. 4 is a block diagram illustrating one embodiment of user-side compliance checker.

FIG. 4 is a block diagram illustrating one embodiment of user-side compliance checker. The checker includes a browser plug-in 410 and/or an application plug-in 415, which enable the compliance checker to interact with the portal and/or the compliance verification system. In one embodiment, a cookie 425 may be present in memory or read from storage if compliance has previously been verified. In one embodiment, a cookie validator 420 provides the cookie, on request, to the portal.

Agent 430 provides access to the data from individual compliance agents 440, 450, 460. The individual compliance agents 440 each are associated with a particular aspect of the user's system that the portal policy specifies should be validated. In this example, an encryption compliance agent 440, a phone lock compliance agent 450, and other compliance agent 460 are shown. The compliance agents may also include operating system/browser version verifier, anti-virus or similar security element verifier, etc.

The encryption compliance agent 440 is shown as including upper and lower drivers 445 in one embodiment. The use of such drivers is described in more detail below.

Figure 5:
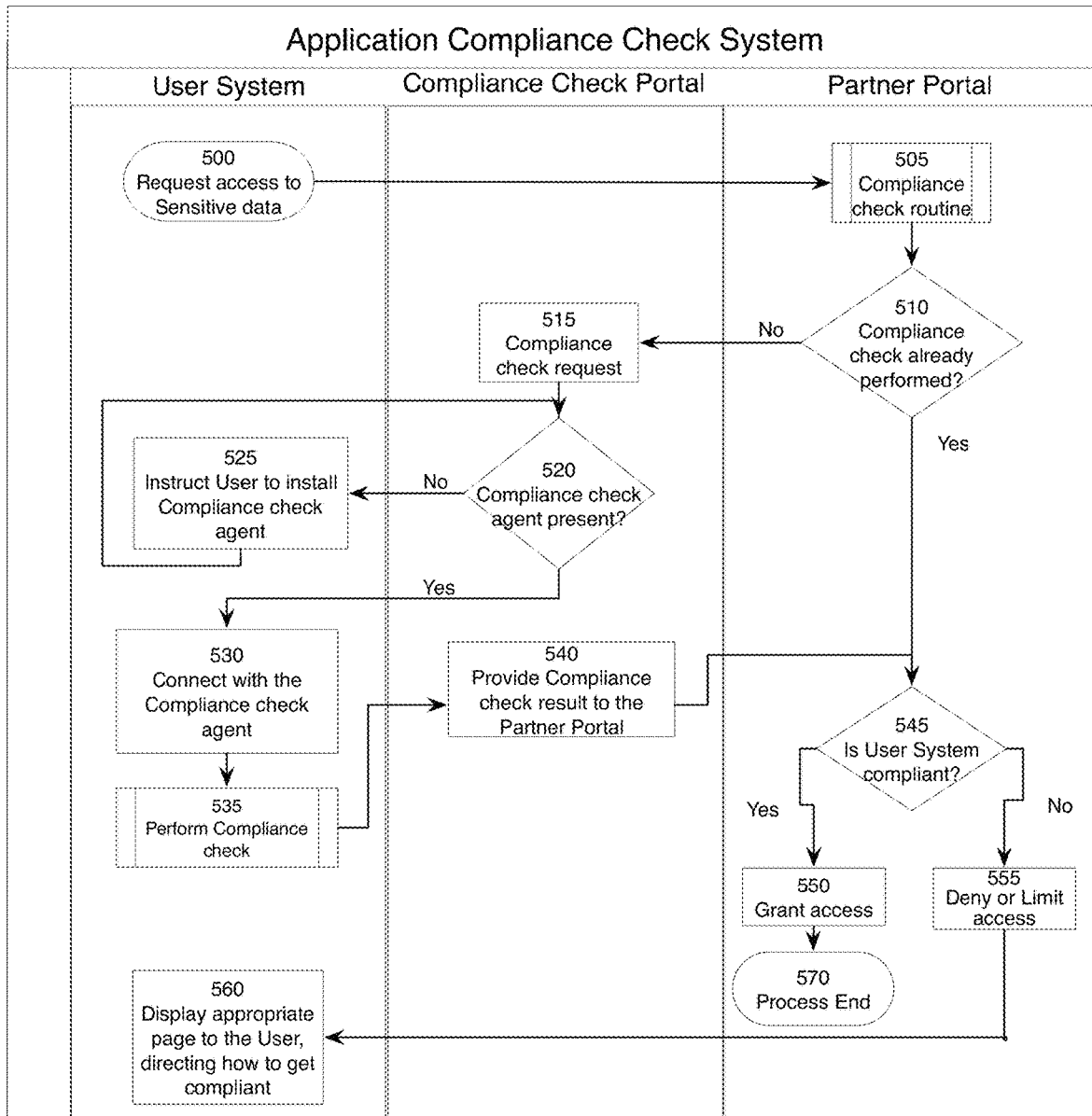
FIG. 5 is a message flow illustration of one embodiment of using the compliance checking system of the present invention.

FIG. 5 is a diagram illustrating one embodiment of the interaction between the end User's computer, the Partner Portal and the Compliance Check Provider Portal. The process is initiated when the user attempts to access the Partner Portal, sensitive information on the Partner Portal, or other data. Control is then shifted from the Partner Portal to the Compliance Check Provider Portal for the compliance check. In one embodiment, the system then returns the user back to the Partner Portal for enforcement, and access if appropriate.

When the user connects to the partner system, the compliance checker plug-in determines whether there is a cookie that indicates that the user's device has been checked for compliance. A cookie, in this context, is a data snippet which indicates the compliance of the device placed on the device by the agent, after verification. In one embodiment, the system determines whether the user's device has a valid cookie. The cookie indicates that the compliance of this particular device has been verified. If there is a valid cookie, the user is returned to the browser and the secure data is made available.

In one embodiment the cookie expires. The expiration may be based on a number of conditions. One condition may be age—cookie may only be used for 10 days. Another expiry condition may be an available agent update. Cookie is not valid if an agent update is available. Another condition may be if a policy change has been made on the CCS system for the partner portal which will then invalidate the cookie. Another condition may be lack of use, e.g. if a device has not been used within the last 48 hours, the validation key may be automatically expired. In one embodiment, when the configuration of the device is changed, the cookie may also be expired. In one embodiment, the cookie may include a hash of the settings and/or configurations which are used in determining compliance, and may automatically expire when the hash does not match the current settings and/or the device configurations.

If there is no valid cookie, the process is redirected to the compliance checker agent. In one embodiment, the compliance checker agent is on the compliance checker server.

In one embodiment the cookie may also indicate a level of compliance, rather than providing a yes/no compliance answer. In one embodiment, the cookie may that may be interpreted by the partner portal to allow different levels of access based on the level of compliance. Some encryption products provide a very good level of security for the encryption while other products may implement weak type of encryption. The Agent may set the level of compliance based on crypto analytics. As an example the agent may check for too simple encryption algorithms such as using XOR or Cesar cipher there only the characters are transposed. The Agent may also apply more advanced crypto analytics such as Frequency analysis where the agent would compare the characters in the known plain text with the characters in the cipher text.

In one embodiment, the compliance checker agent includes an encryption compliance checker plugin, which would be installed on the user's device. Other compliance checker plug-ins may also be installed. The user-side compliance checker controls the flow of events, manages the individual compliance agents (one agent for each type of compliance check) and reports the result to the browser or application plugin and updates the cookie. The individual compliance agent manages the flow of the corresponding compliance check and for encryption it is the component that compares the result from the compliance checker driver(s).

The encryption compliance checker plug-in in one embodiment utilizes a data comparison system, to determine whether data stored on the disk is properly encrypted. In one embodiment, an upper driver and a lower driver are used, and installed above and below where a disk encryption driver would be. If the data which is detected below such a driver is identical to the data above the driver, the system does not include full data encryption.

If the user's system is found compliant, access is granted to the sensitive data. If the user system is not compliant, then the user is informed about how to achieve the required compliance. In one embodiment, the user may be redirected to a system that provides appropriate disk encryption for installation, which would be compliant or remediate the compliance issue.

If the system determines that the appropriate type of data encryption is present, the compliance checker agent adds a cookie, validating the compliance checker plug-ins verification. In this way, when the system next attempts to access the data, the cookie may be used, to avoid rechecking when not needed and avoid rechecking too frequently, because that slows down access to the protected data.

Methods of Hard Disk Encryption Detection

In one embodiment, the system will use one of four base methods for detecting if the data is encrypted. The first method can be used when the OS provides a Native encryption service and API. Second approach will be used for hardware supported encryption systems. The approach is a general detection mechanism that can detect encryption or data transformation by a vast number of vendors that install custom drivers without prior knowledge of the vendor and its methods. A fourth method utilizes a database of characteristics such as file/directory names, registry keys and services running, with entries for each specific product that would constitute compliance or non-compliance when detected. In one embodiment the described methods can be used to update a database used in the fourth method, for blacklisting and whitelisting products that are considered compliant.

Some versions of Windows and OS X come with built-in disk encryption services. These services provide a command-line interface that can be used to get the encryption status of disk(s) using the native encryption.

There are also self-encrypting disks (SED) available in the market, which implement the encryption in the disk hardware and therefore do not require any software at the system level to encrypt the data. The driver could therefore check the disk type and disk parameter to get the encryption status of the SED disks. In one embodiment, IEEE 1667 and/or Opal protocols may be detected, to verify SED disk use.

The most accurate verification is provided using a unique method that uses a disk data stream intercept mechanism to detect whether the disk is encrypted or not. This is a unique and extremely accurate approach for detecting encryption compliance status.

FIG. 5 is a message flow illustration of one embodiment of using the compliance checking system of the present invention. The user requests access to the sensitive data (block 500) through partner portal. The compliance check routine (block 505) on partner portal determines whether a compliance check was already performed (block 510). If not, in one embodiment, the user is informed that in order to access the (Partner) Portal/data "a compliance check will need to be performed on their system" and the user is asked to approve installing the plugin (block 525). This compliance check agent (once installed) collects Encryption Compliance status of the disks and shares this information with the Partner Portal.

In one embodiment, the information may be shared by placing a cookie on the user's system. In one embodiment, the CCS system may communicate directly with the Partner Portal. In one embodiment checking of compliance on the Partner Portal is performed only by checking the user system cookie to verify that compliance check has already been performed (block 510).

When the Partner Portal redirects the user to the CCS Provider portal, the CCS portal will detect whether or not the proprietary agent is running on the User's system (block 520). If not, in one embodiment, the CCS provider portal directs the User to download and install the agent (block 525). In one embodiment, the agent comprises OS specific elements e.g. a background service and/or compliance drivers on Windows. This agent installation needs to be carried out only once on a system. Once installed, the agent will run and will respond to the requests made by the CCS. In one embodiment, this agent will be configured to run automatically during subsequent System start-ups, thus making it automatically available to respond at next/future Compliance check(s).

In one embodiment, once the agent is used to validate the encryption status of the user's device, a cookie may be added to the system, so that compliance check does not need to be run each time.

Mac OS X may not require the user to have any special privileges to retrieve Encryption Compliance status of the disks. In one embodiment, no driver installation is used on such systems.

In one embodiment, in Linux has a driver "stack" and in one embodiment, the agent may include the upper and lower driver. The system would then redirect calls for the encryption driver to the upper and lower driver thus implementing a filter stack similar to the one on Windows.

Mobile operating systems like Android systems, iOS systems may also have either drivers installed, or may have their compliance verified via operating system-level verification, when available. Compliance may include verifying encryption status, verifying the status of the Phone Lock on/off, and other compliance checks.

Commonly checking for encryption compliance on phones happens in a particular phone application or at the device management system. In one embodiment a smartphone app (e.g. a healthcare app) has a cookie which is checked for compliance by the partner site when the app is used to access the data. The cookie and verification may be done by the CSS system, rather than by the phone app. The cookie in the app would report the status of the built in agent check and the partner portal would determine the access or access level based on the cookie. In one embodiment, the cookie and the reporting is done by the mobile device management system, rather than an application.

When a user connects to the portal using a browser, in one embodiment, the CCS Provider Portal will make use of a client side script to communicate with the agent (service) already installed on the user's system to query and detect Encryption Compliance Status of User's system (block 535).

After successful Compliance check, in one embodiment, CCS portal will store a persistent cookie on User System, in one embodiment. In another embodiment, if the cookie cannot be stored on the device, a cookie may be stored together with device identifying metadata on the CCS server instead of on the device. In one embodiment, this metadata identifies the device (using one or more of a Product ID, MAC address, Processor Serial Number, Hard Drive Serial Number, or other Unique Device Identifier (UDID), installed version of the compliance-providing systems, dates. This may be useful for systems in which the device is reset to a known good state frequently, or in which the system does not permit cookies. In one embodiment a cookie may be stored both on the device and on the CSS server to take care of the case where device permit installs and changes but will reset to a known initial state after each session. Next time, when the user attempts to access the Portal/data, the portal will look for the Cookie and determine whether the Cookie is present and is valid (i.e. not expired or invalidated e.g. based on indicated installed version). Portal/data will use the information from this Cookie to read the Encryption Compliance status of the system. This method will save/prevent multiple compliance checks if a user is frequently accessing sensitive information on the partner portal.

After performing the compliance check (block 535) the results are passed by the compliance checking portal to the partner portal (block 540). The partner portal determines whether the user system is compliant (block 545) and either provides access to the requested sensitive data (block 550), or denies access (block 555). If access is denied, the user device is provided with information to enable compliance (block 560).

Figure 6:
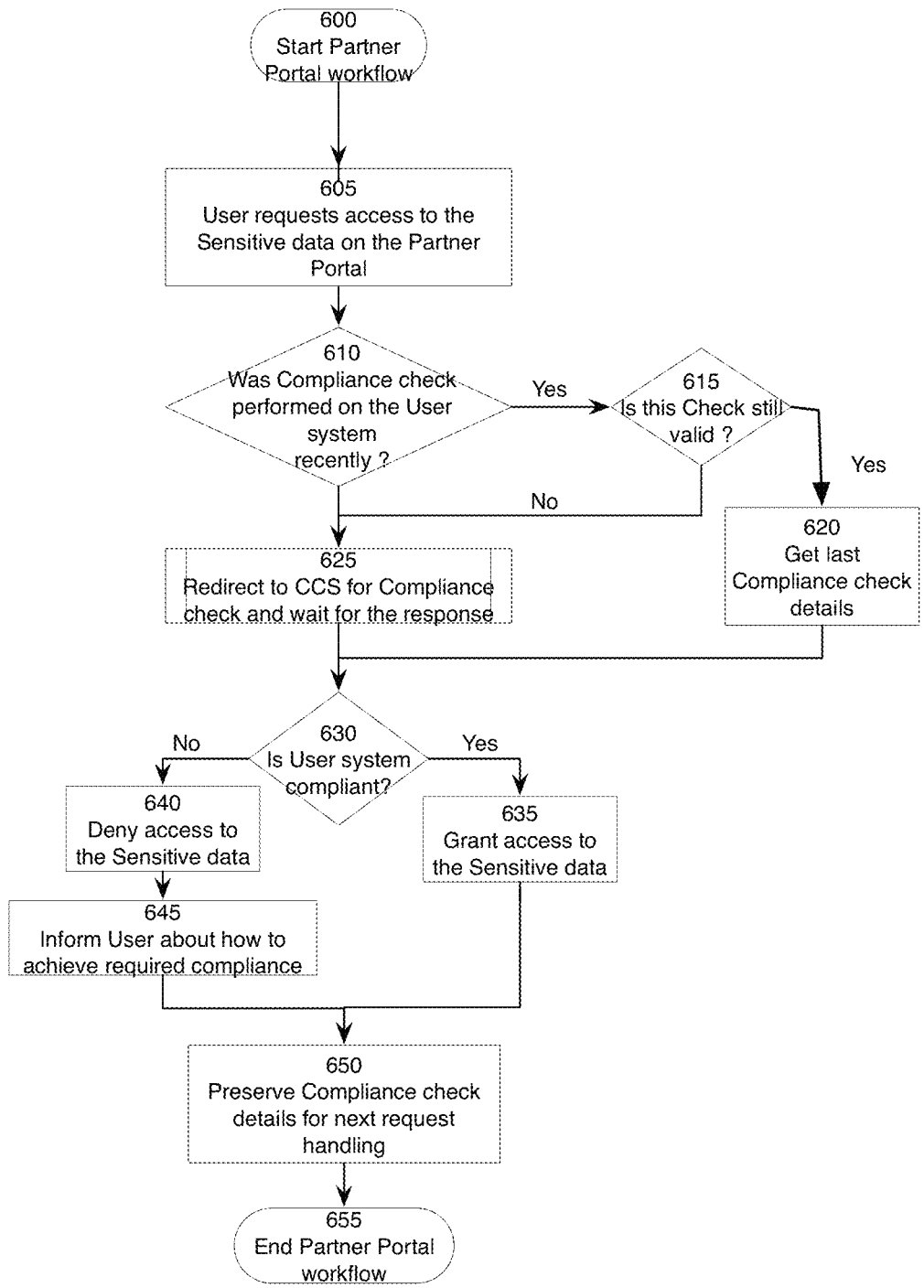
FIG. 6 is a flowchart of one embodiment of compliance checking from the perspective of the portal.

FIG. 6 is a flowchart of one embodiment of the partner portal workflow. The partner portal in one embodiment checks the cookie status directly (block 610), and redirects to the compliance check and verification system if no cookie is detected (block 625) or the cookie is expired (block 615). The data returned by the compliance check and verification system is used to either deny access (block 640) or grant access (block 635). The compliance check result is preserved (650), in one embodiment as a cookie, for future validation. In one embodiment, such cookies have an expiration period. In one embodiment, the partner portal may set the expiration period anywhere from 0 (e.g. expire immediately) to infinity (as long as no changes are made to the user's system, the cookie remains valid.) In one embodiment, the default recommendation is to maintain a cookie for 30 days. In one embodiment, the CCS portal may set the expiration period.

Figure 7:
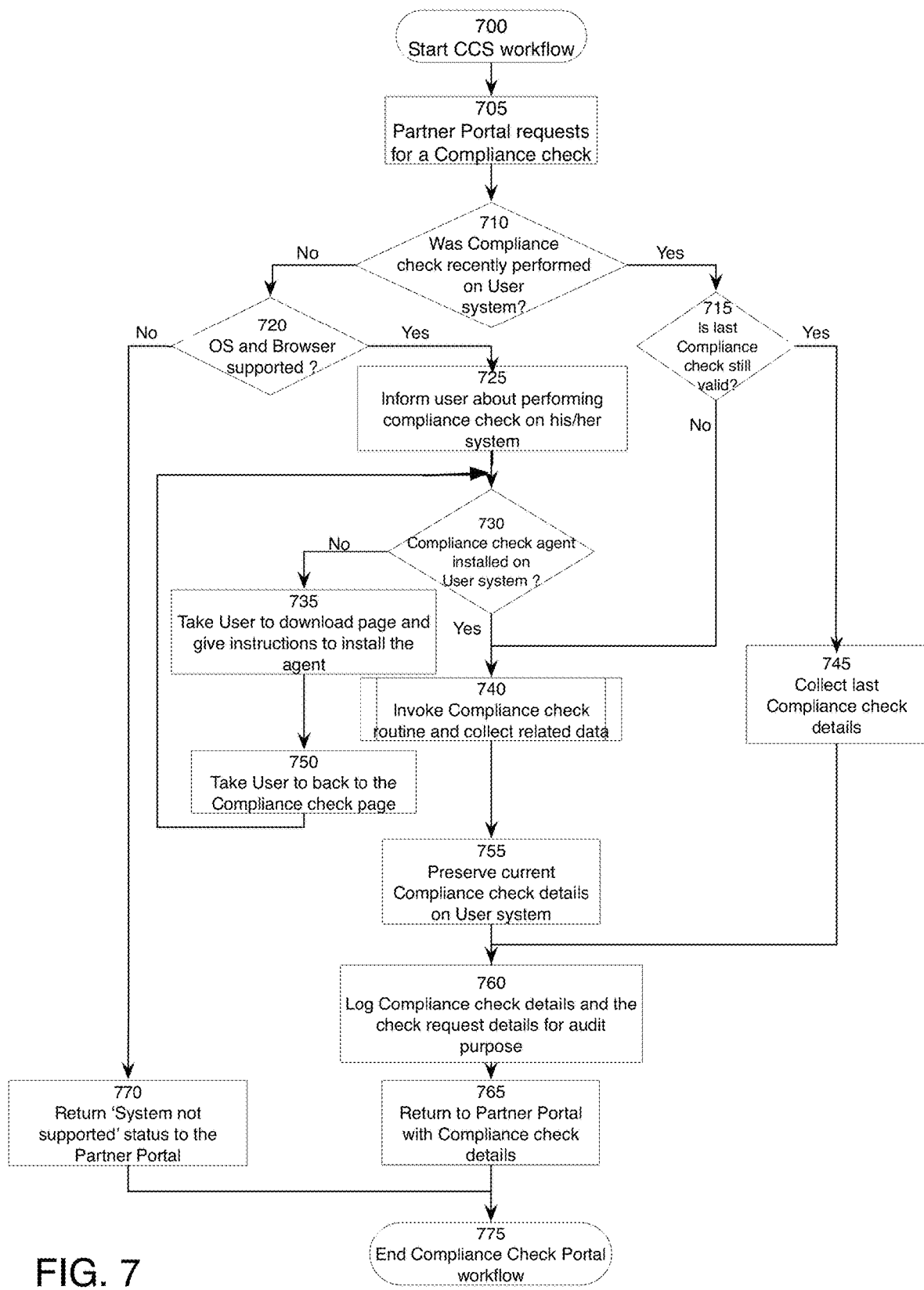
FIG. 7 is a flowchart of one embodiment of compliance checking from the perspective of the compliance checking system.

FIG. 7 is a flowchart of one embodiment of compliance checking from the perspective of the compliance checking system. The process is initiated when the partner portal requests a compliance check (block 705). If there is no valid existing compliance check (block 710), the system informs the user (block 725) and installs the agent(s) (block 730). It invokes the compliance check routine (block 740), and logs the details (block 760), before returning data regarding compliance to the partner portal (block 765).

Installation and Use of Disk Encryption Detection

Disk encryption products, independent of vendor, work in a similar manner and insert a driver in between the Operating System and the storage media/disk.

Figure 12:
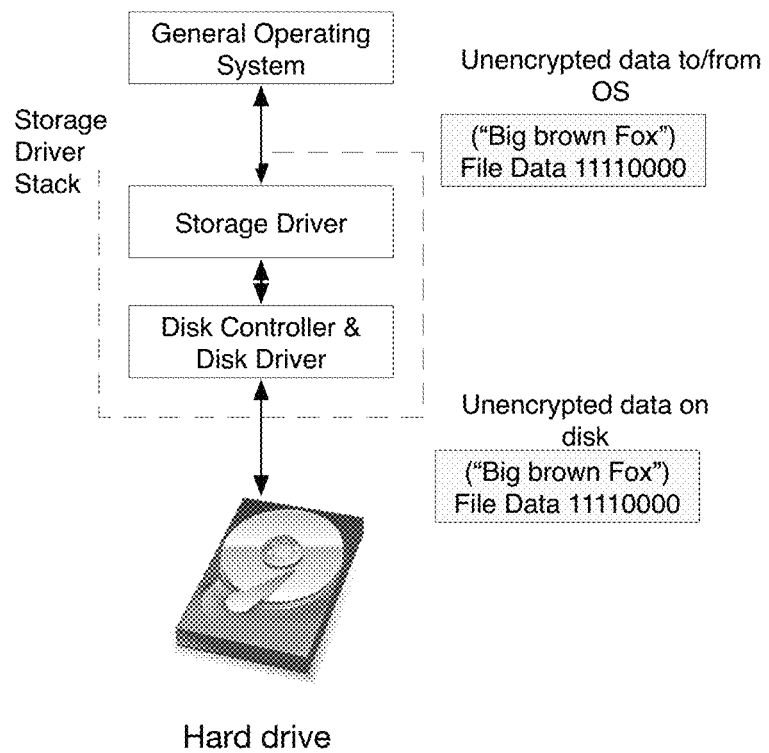
FIG. 12 is a block diagram illustrating one embodiment of the client storage stack before encryption is added.

There are naturally other drivers in the storage stack before any disk encryption product is installed. The operating system talks to a high level storage driver that abstracts details about controllers, disks and storage media. There may be other abstraction layers, but to address the essential elements, above the disk the system includes a disk controller driver and a disk driver that talks to the disk. Before any disk encryption product is installed, as FIG. 12 shows, data from the OS is stored without alteration unencrypted on the disk. Anyone that analyses the data on the disk can read the data in clear text.

Figure 10:
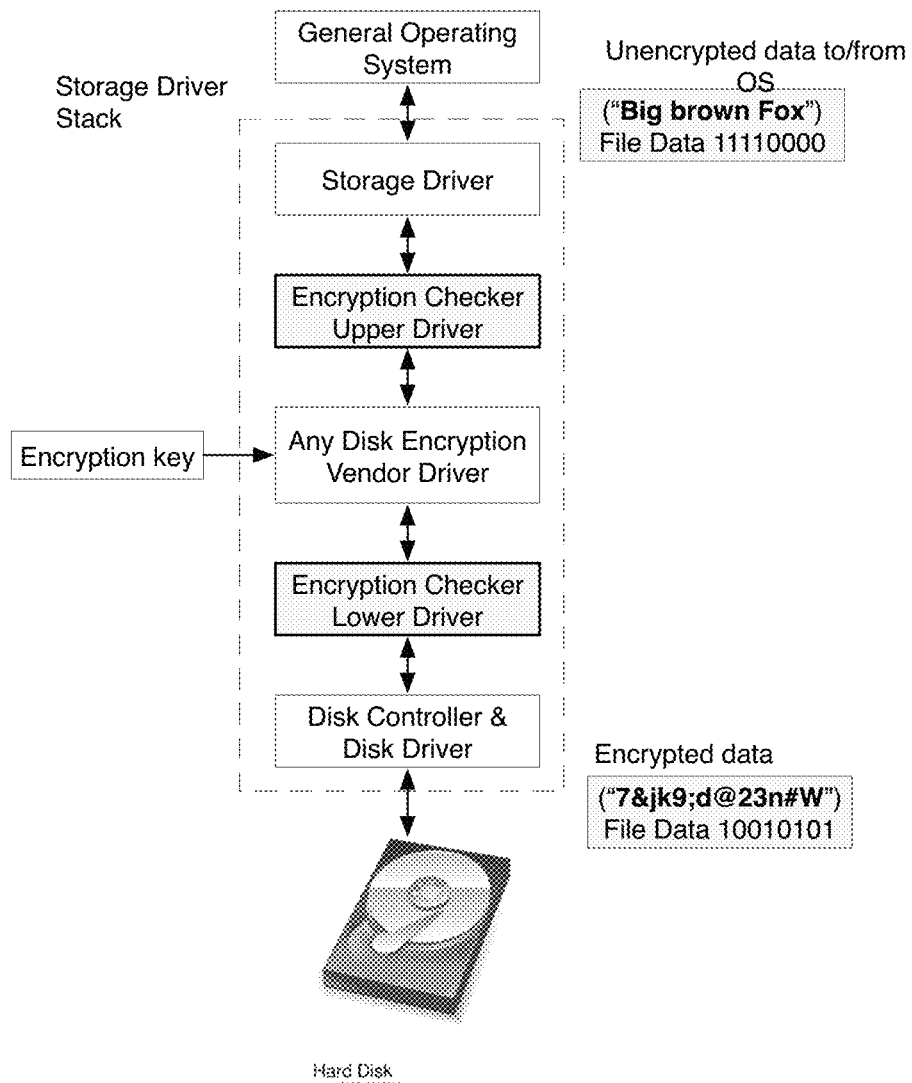
FIG. 10 is a diagram showing one embodiment of the relative locations of the elements of the encryption checker of the present invention.

Disk encryption vendors insert their drivers in the storage driver stack. The encryption driver intercepts data sent to the disk, and encrypts it. The encryption driver also intercepts data read from the disk and decrypts it. Both reading and writing data uses the disks encryption key so that normally all data on the disk is encrypted using the same disk encryption key/same set of keys. FIG. 10 illustrates of one embodiment of the system including the encryption driver using a disk encryption key.

Figure 11:
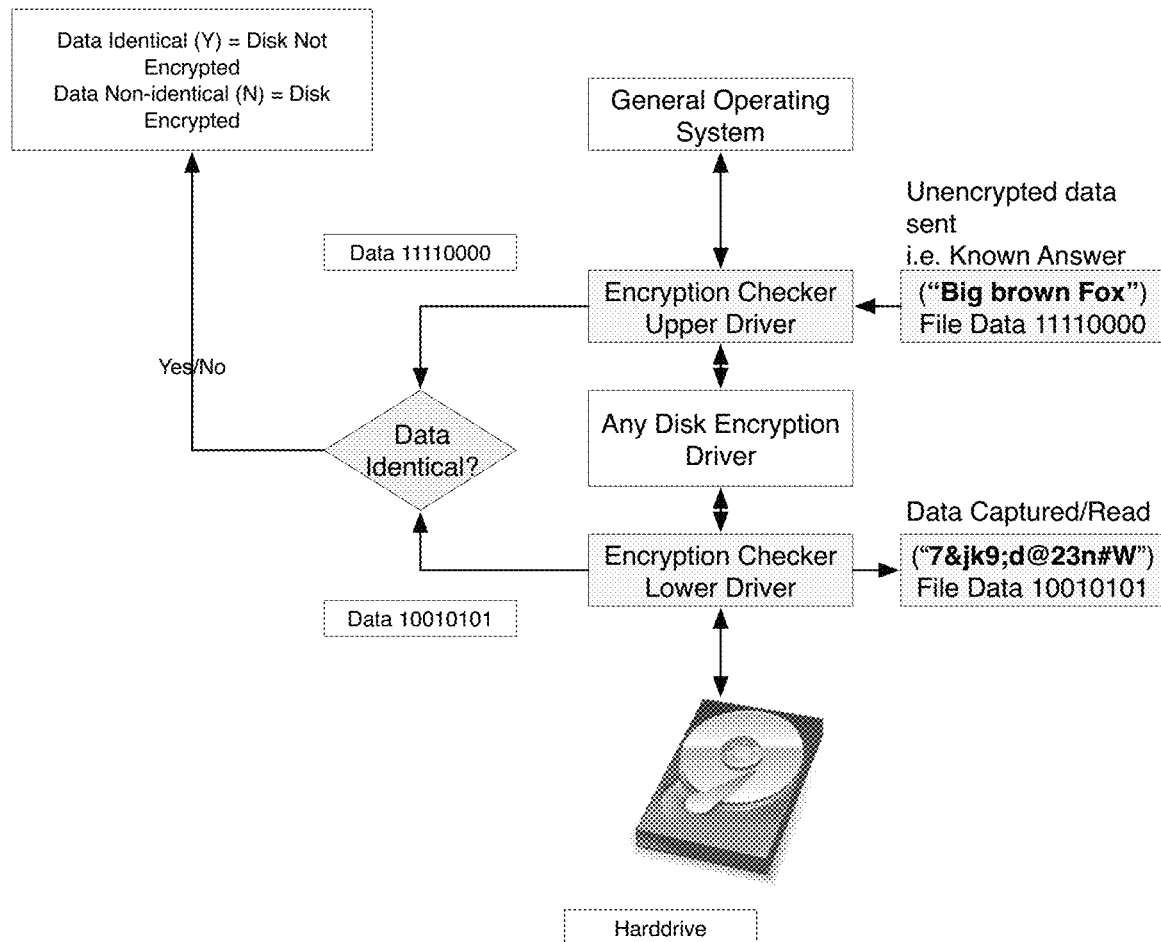
FIG. 11 is a diagram showing the system and actions from the user's perspective, in disk encryption verification.

In order to capture any encrypted DataStream/encrypted data on the disk, the system inserts an encryption detection driver in-between the disk encryption driver and the disk controller driver. FIGS. 10 and 11 illustrate embodiments of the two drivers, used to capture the data. The system also captures the original data stream just before it is sent to the encryption driver. Having access to the data stream on both sides of the Encryption Driver, the system can detect if there is a difference i.e. if the data was altered by the driver, indicating that it was encrypted.

If the data was identical, the system determines that there is no encryption driver or at least there is no encryption active. This indicates that the system is not compliant, and the secure data should not be made accessible to the system. If the data was altered by the encryption driver then the system determines that the data may be encrypted. In one embodiment, the system can determine, when the data was not identical, that it was compressed or scrambled, rather than encrypted. In one embodiment, basic cryptographic analysis may be applied to the data, to ensure that the quality of the encryption meets basic standards.

Figure 9:
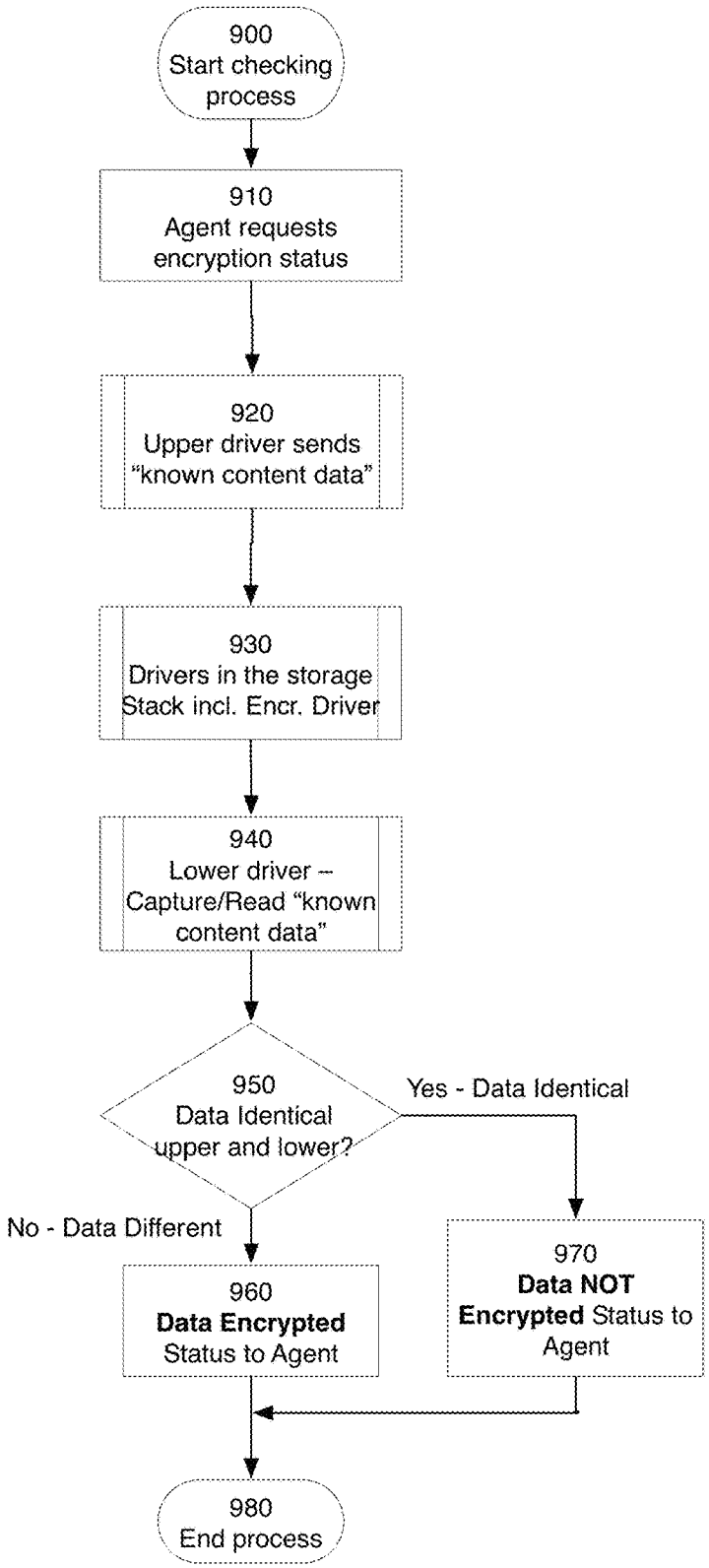
FIG. 9 is a flowchart of one embodiment of disk encryption verification.

FIG. 9 is a flowchart of one embodiment of the detection process. In one embodiment, the process works as follows. At block 910, the agent initiates process and requests encryption status. At block 920, the upper Encryption Checker Driver sends down a buffer of known content. The known content may be plain text.

At block 930, the data is passed through any drivers sitting in between the two Upper and Lower encryption drivers. At block 940, the Lower Encryption Checker Driver captures the known content, after it passes through the drivers. At block 950, the data obtained from the two drivers are compared. At block 950, the process determines whether the data from the two driver buffers is identical. If the data is identical then, at block 970 the system determines that the data is not encrypted. If the data is not identical, then at block 960 the system determines that the data is encrypted. In one embodiment, the data is first verified to ensure that it's not only compressed. In one embodiment, the system may also check that the encryption meets standards, and the data was not just compressed, merely scrambled or using inadequate encryption. The process then ends at block 980.

Figure 8:
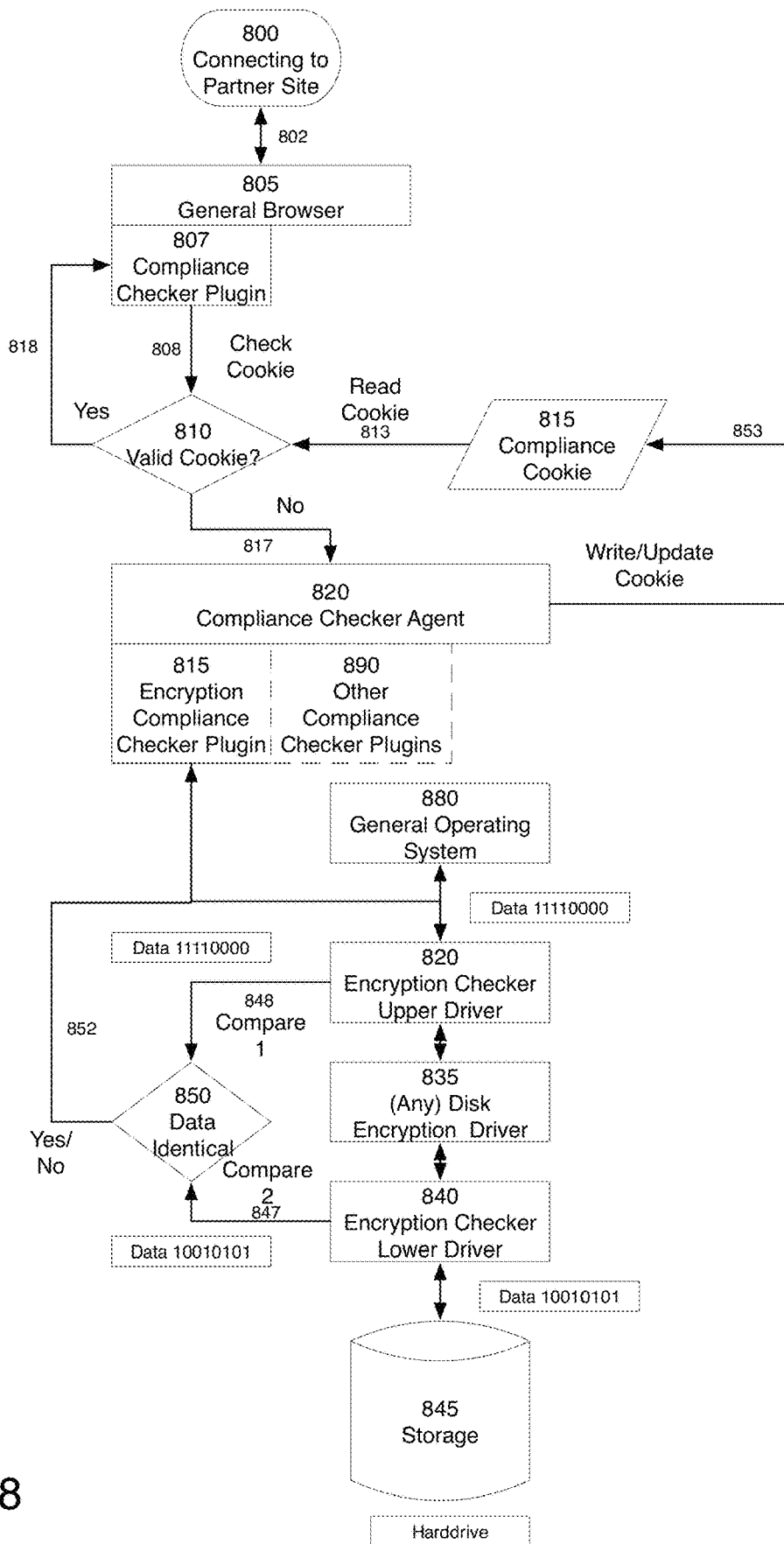
FIG. 8 is a flowchart of one embodiment of compliance checking from the perspective of the user device.

FIG. 8 illustrates one embodiment of the compliance check process on the actual client. The process is initiated by the user visiting a partner web site and the site is requesting a compliance check. This is picked up by the browser/application plugin which signals the request to the agent. The user-side compliance checker checks if the current cookie is valid. If not, the agent finds the corresponding individual compliance agent (matching the request).

As described previously, if the cookie is not valid the client will be redirected to the compliance check provider which will be able to give additional directions to the client before the internal compliance check starts on the client.

Once the check is completed the cookie is updated, in one embodiment, and the status is handed back to the site and client is redirected back to the partner site.

The process starts when the user connects to Web site, Portal, or other secure data source (800) using a general browser or application (805). The browser may have an installed plugin (807) for compliance check, in one embodiment.

The Site initiates the request for the compliance check. The user-side compliance checker checks if the cookie is still valid (810). If it is valid (818) then the user-side compliance checker reports the cookie status to the Site.

If the Cookie (815) is not valid then the agent (820) is requested to initiate a compliance check for the subsystem that was indicated in the checking policy received from the partner site. In this case the subsystem is Encryption so the (815) Encryption individual compliance agent is requested to perform a check.

The Encryption individual compliance agent (815) initiates the check (817) by connecting to (820) Upper Compliance Checker Driver. The Upper Compliance Checker Driver (220) sends a known content to be stored on the disk (845). This data is sent through any drivers (835) sitting between upper (820) and lower (840) compliance check drivers. The lower driver (840) captures the known content.

The Encryption individual compliance agent (815) then reads the data (848) from the upper driver to compare the data from the Upper driver (820) and the Lower driver (840). The result of the comparison (850) is reported by the Encryption individual compliance agent to the agent, which updates the Compliance cookie (815).

The resulting compliance status is handed over via the browser/application plugin (807) to the Site.

Figure 13:
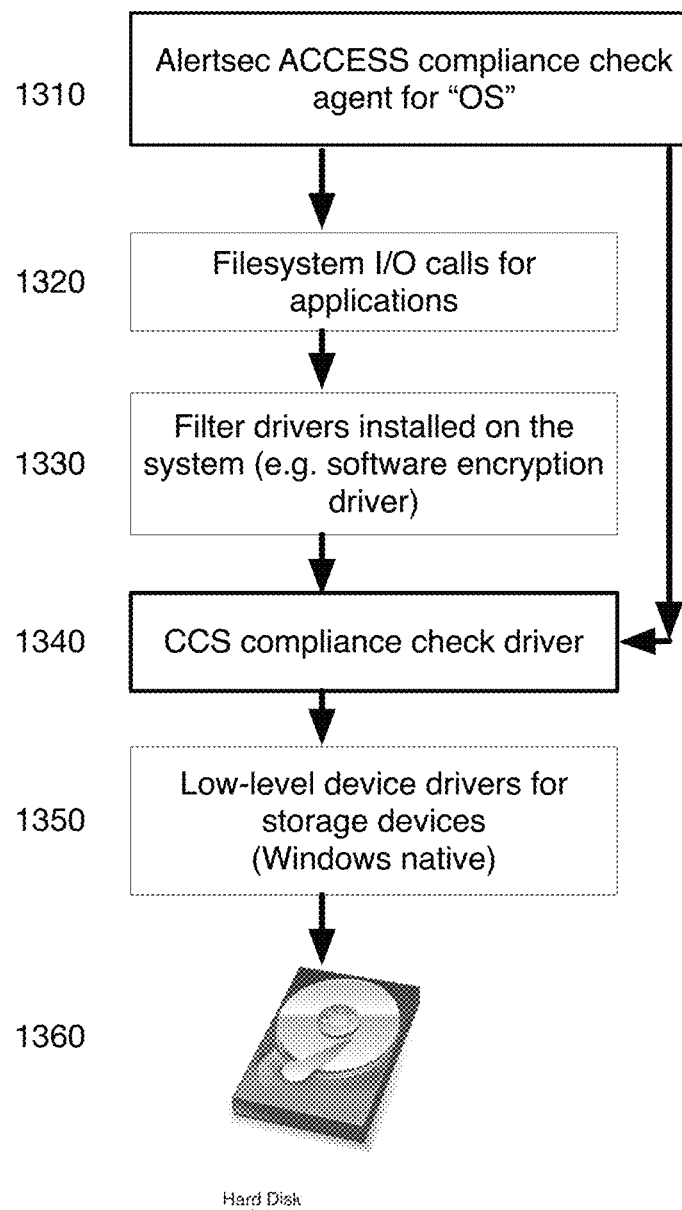
FIG. 13 is a block diagram illustrating one embodiment of a client configuration including the agent and compliance check driver.

FIG. 13 is a block diagram illustrating one embodiment of a client configuration including the agent and compliance check driver. The principle of detection in this method is based on comparing if the data read from the disk using application level file system calls matches with the same data directly read from the disk using low-level disk controller command. In one embodiment, the agent creates a new file and writes pre-defined (incompressible) plain-text data to the file. The service determines a location of the file. In one embodiment, service determines the Logical Cluster Number (LCN) for the file created. In one embodiment, the service loads a kernel mode driver (driver). The service communicates with the driver to pass on the location information to a buffer in one embodiment. The driver reads the physical device and device geometry, and derives disk offset for the file using the location information. Using this information, the driver issues a read request to the lower level driver (next in the chain of drivers on the system) to read raw disk sector/data location on the drive. The driver returns raw data to the service. In one embodiment this is done using the buffer.

The service reads the data from the file using application level file I/O calls and compares it with the raw data received from the driver. If the data read by application level file I/O calls and the raw data directly read from the disk using the driver match then the service determines that the disk is unencrypted or else the disk is encrypted.

Figure 14:
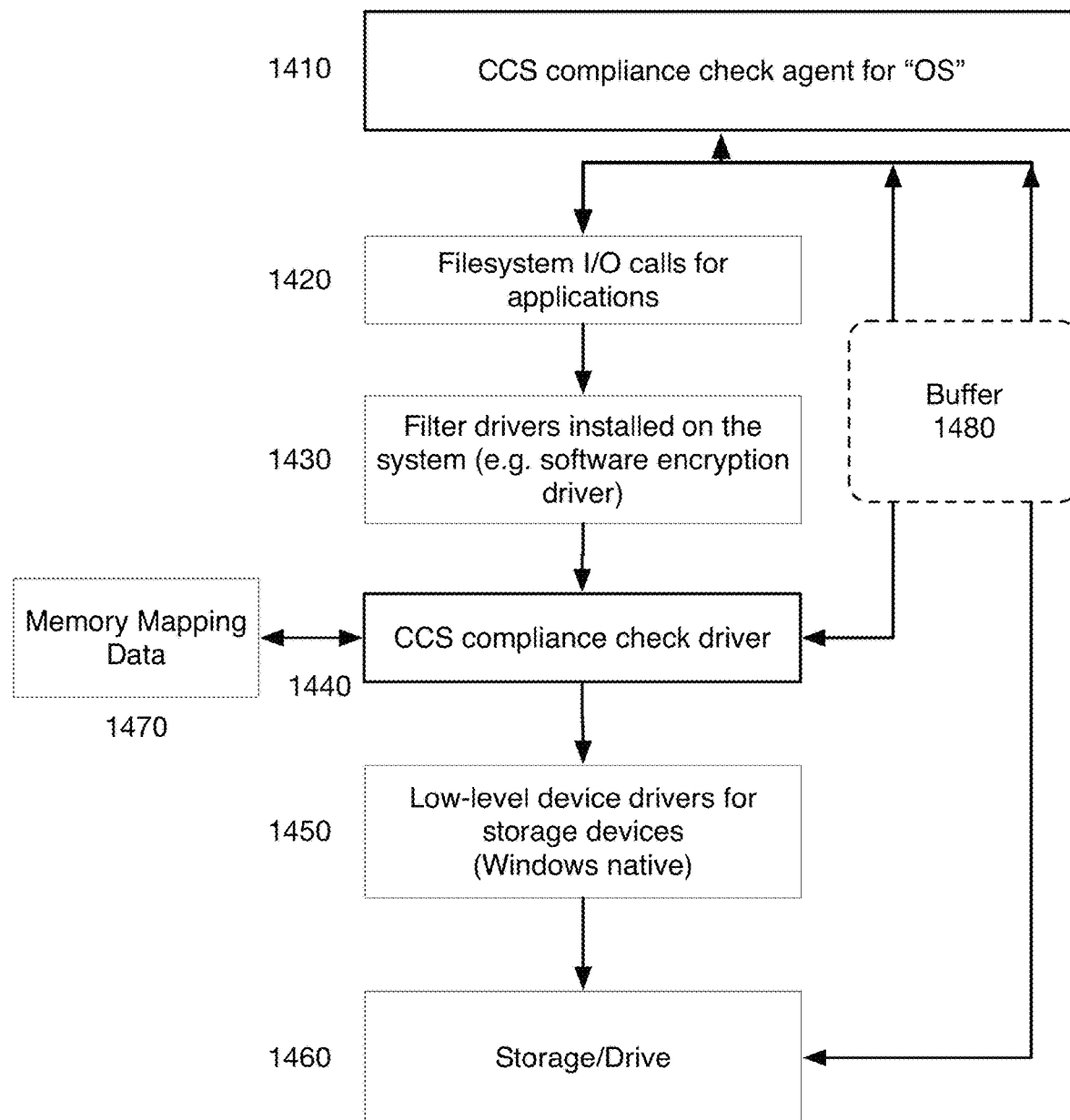
FIG. 14 is a block diagram illustrating one embodiment of a client configuration including the agent and compliance check driver and mapping table.

FIG. 14 is a block diagram illustrating one embodiment of a client configuration including the agent and compliance check driver, buffer, and mapping data. It shows the flow of data between compliance check agent 1410 and CCS compliance check deriver 1440, through buffer 1480. In one embodiment, the identification of the physical device location is based on memory mapping data. The determination of the physical location of a file on a storage is known in the art.

Figure 15:
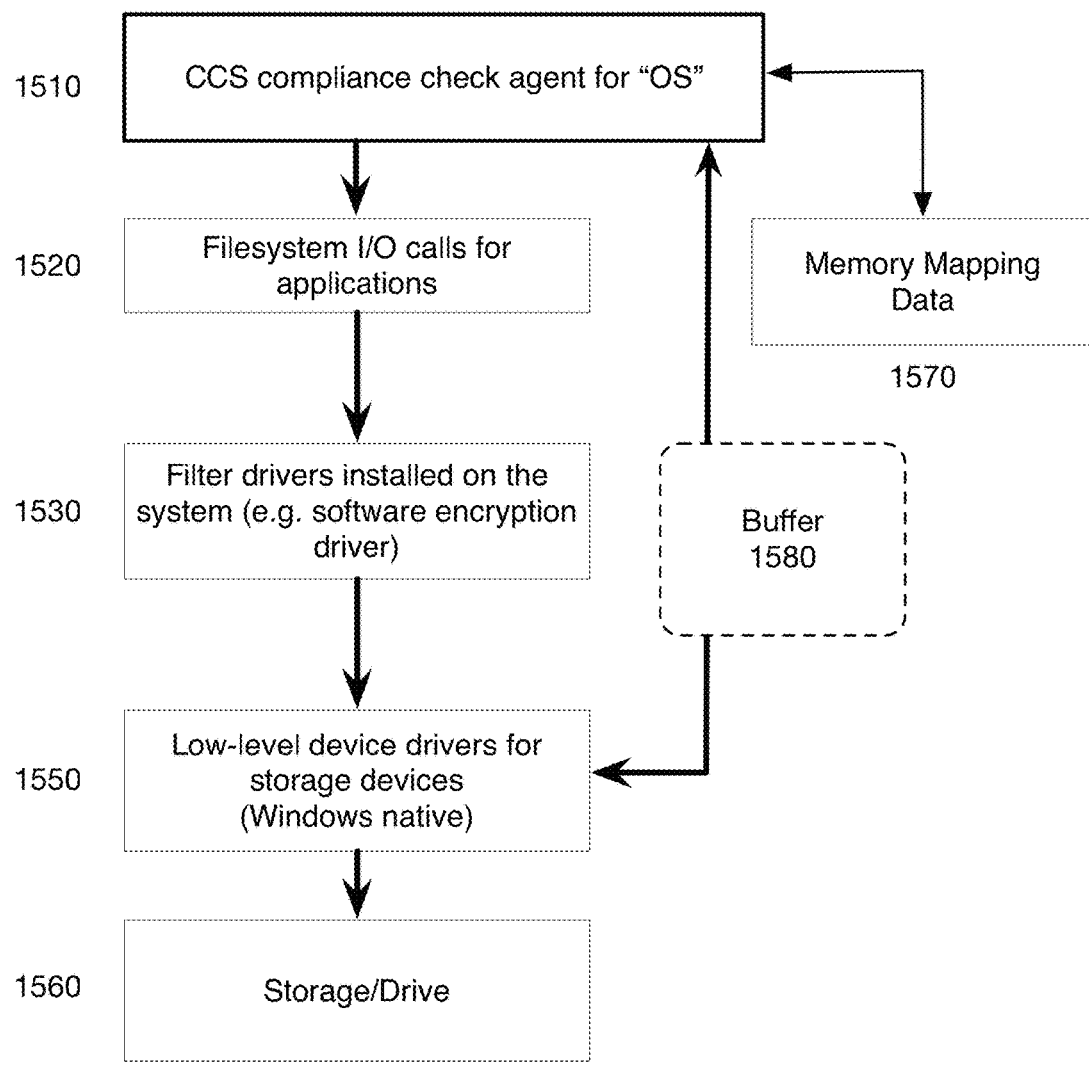
FIG. 15 is a block diagram illustrating one embodiment of a client configuration including only the agent and mapping table.

FIG. 15 is a block diagram illustrating one embodiment of a client configuration including only the agent and mapping table. This configuration does not utilize any custom drivers, but rather relies on the drivers of the operating system itself.

In one embodiment, the service creates a new file and writes pre-defined (incompressible) plain-text data to the file. The service determines the Logical Cluster Number (LCN) for the file created. The service loads a kernel mode driver (driver), which is a native driver of the operating system. The service communicates with the driver to pass on the LCN information and a buffer.

The driver reads the physical device, device geometry and derives disk offset for the file using the LCN. Using this information, the service/driver calculates specific parameters (e.g. head and track details for magnetic disks and memory map in case of SSDs) and reads raw data directly from the disk using appropriate disk controller commands depending on the disk type (e.g. SCSI, SATA, NVMe etc.) The disk returns raw data to the service/driver. In one embodiment, the data is returned using the buffer provided.

Figure 16:
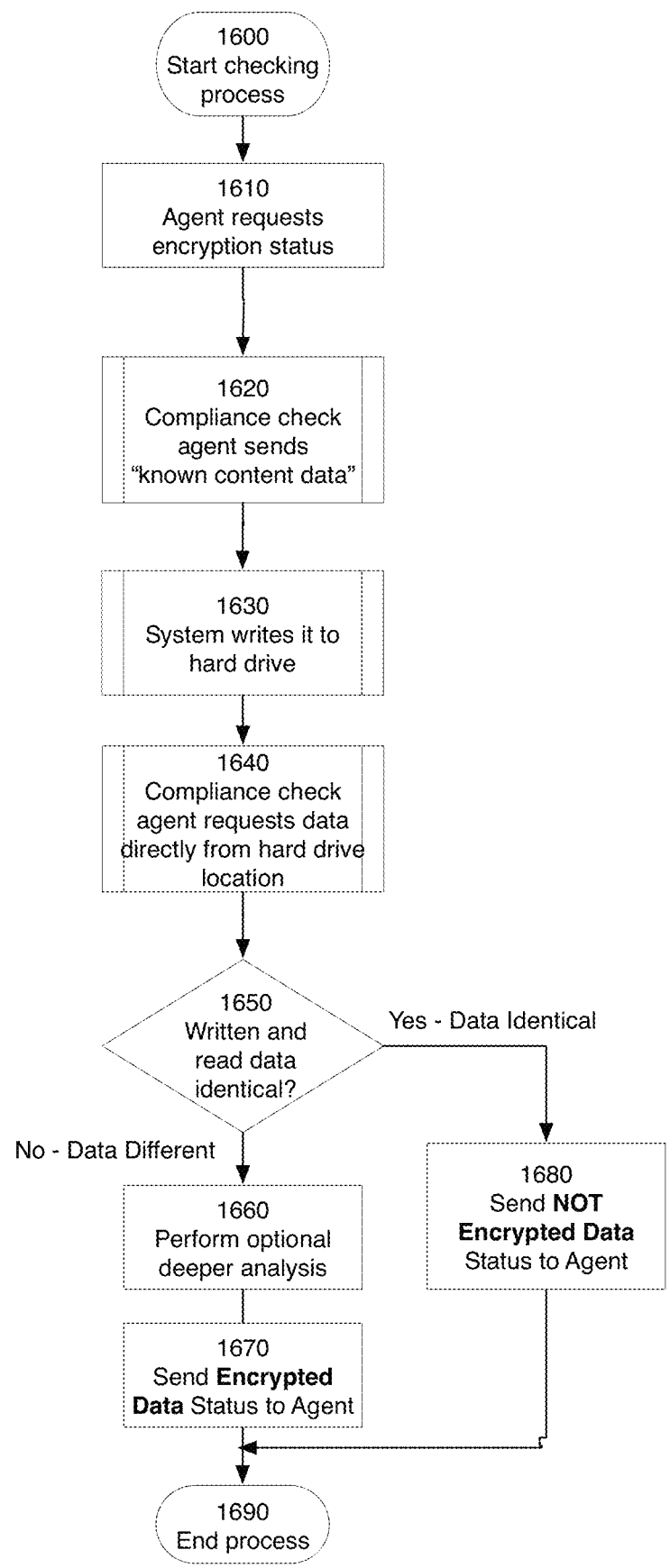
FIG. 16 is a flowchart of one embodiment of executing an encryption compliance utilizing a compliance check agent and memory mapping table.

The service reads the data from the file created using application level file I/O calls and compares with the raw data received from the disk. If the data read by application level file I/O calls and the raw data directly read from the disk using the driver match then the service determines that the disk is unencrypted or else the disk is encrypted FIG. 16 is a flowchart of one embodiment of executing an encryption compliance utilizing a compliance check agent and memory mapping table. The process starts at block 1600. In one embodiment, the process is initiated when the agent requests encryption status of the device drive.

At block 1620, the service creates a new file and writes pre-defined (incompressible) plain-text data to the hard drive. This is known content data. At block 1630, the data is written to the drive. In one embodiment, the service determines the Logical Cluster Number (LCN) for the file stored on the drive.

At block 1640, the compliance check agent requests data directly from the hard drive location. The agent receives the data from the drive.

At block 1650, the agent compares whether the written data and the data read from the drive are identical. If the data is identical, at block 1680 the process determines that the data is not encrypted and sends back this status. If the data is not identical, the data is encrypted. At block 1660, the process optionally performs a deeper analysis of the data. This may be used to detect compression, weak encryption, or other issues. In one embodiment, any detected issues may be reported in a status message or through another mechanism. In one embodiment, this may be used for virus checking or other detection as well. At block 1670, the status of the data is returned. at block the process determines that the data is encrypted. The process then ends at block 1690.

Figure 17:
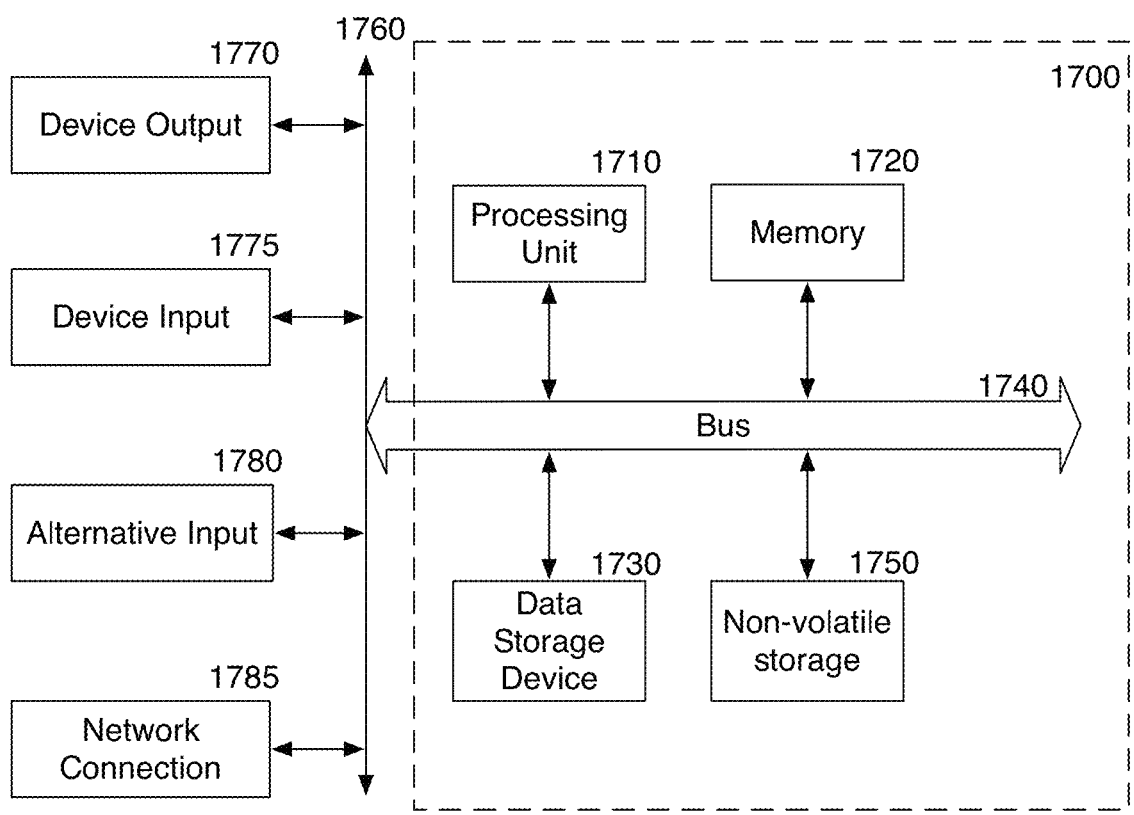
FIG. 17 is a computer system that may be used with the present invention.

FIG. 17 is a block diagram of one embodiment of a computer system that may be used with the present invention. It will be apparent to those of ordinary skill in the art, however that other alternative systems of various system architectures may also be used.

The data processing system illustrated in FIG. 17 includes a bus or other internal communication means 1740 for communicating information, and a processing unit 1710 coupled to the bus 1740 for processing information. The processing unit 1710 may be a central processing unit (CPU), a digital signal processor (DSP), or another type of processing unit 1710.

The system further includes, in one embodiment, a random access memory (RAM) or other volatile storage device 1720 (referred to as memory), coupled to bus 1740 for storing information and instructions to be executed by processor 1710. Main memory 1720 may also be used for storing temporary variables or other intermediate information during execution of instructions by processing unit 1710.

The system also comprises in one embodiment a read only memory (ROM) 1750 and/or static storage device 1750 coupled to bus 1740 for storing static information and instructions for processor 1710. In one embodiment, the system also includes a data storage device 1730 such as a magnetic disk or optical disk and its corresponding disk drive, or Flash memory or other storage which is capable of storing data when no power is supplied to the system. Data storage device 1730 in one embodiment is coupled to bus 1740 for storing information and instructions.

The system may further be coupled to an output device 1770, such as a cathode ray tube (CRT) or a liquid crystal display (LCD) coupled to bus 1740 through bus 1760 for outputting information. The output device 1770 may be a visual output device, an audio output device, and/or tactile output device (e.g. vibrations, etc.)

An input device 1775 may be coupled to the bus 1760. The input device 1775 may be an alphanumeric input device, such as a keyboard including alphanumeric and other keys, for enabling a user to communicate information and command selections to processing unit 1710. An additional user input device 1780 may further be included. One such user input device 1780 is cursor control device 1780, such as a mouse, a trackball, stylus, cursor direction keys, or touch screen, may be coupled to bus 1740 through bus 1760 for communicating direction information and command selections to processing unit 1710, and for controlling movement on display device 1770.

Another device, which may optionally be coupled to computer system 1700, is a network device 1785 for accessing other nodes of a distributed system via a network. The communication device 1785 may include any of a number of commercially available networking peripheral devices such as those used for coupling to an Ethernet, token ring, Internet, or wide area network, personal area network, wireless network or other method of accessing other devices. The communication device 1785 may further be a null-modem connection, or any other mechanism that provides connectivity between the computer system 1700 and the outside world.

Note that any or all of the components of this system illustrated in FIG. 17 and associated hardware may be used in various embodiments of the present invention.

It will be apparent to those of ordinary skill in the art that the particular machine that embodies the present invention may be configured in various ways according to the particular implementation. The control logic or software implementing the present invention can be stored in main memory 1720, mass storage device 1730, or other storage medium locally or remotely accessible to processor 1710.

It will be apparent to those of ordinary skill in the art that the system, method, and process described herein can be implemented as software stored in main memory 1720 or read only memory 1750 and executed by processor 1710. This control logic or software may also be resident on an article of manufacture comprising a computer readable medium having computer readable program code embodied therein and being readable by the mass storage device 1730 and for causing the processor 1710 to operate in accordance with the methods and teachings herein.

The present invention may also be embodied in a handheld or portable device containing a subset of the computer hardware components described above. For example, the handheld device may be configured to contain only the bus 1740, the processor 1710, and memory 1750 and/or 1720.

The handheld device may be configured to include a set of buttons or input signaling components with which a user may select from a set of available options. These could be considered input device #1 1775 or input device #2 1780. The handheld device may also be configured to include an output device 1770 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 1710, a data storage device 1730, a bus 1740, and memory 1720, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1785.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1710. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A compliance check system to provide compliance validation for a device, the compliance check system comprising:

a compliance checker plug-in on a device to be validated, the compliance checker plug-in receiving a request for compliance validation prior to access to a secured resource;
an encryption compliance check comprising:
  an encryption compliance checker agent, to initiate the compliance check, in response to receiving the request, and further to obtain an original file created to be written to a drive and a copy of the file from the drive; and
  a comparator to determine whether the original file and the copy of the file are identical;
the compliance checker plug-in verifying the compliance status of the device, based on data from the comparator;
when the compliance status of the device is failure, the compliance check system to redirect to an install site, to remediate the failure by installing software and reconfiguring the device; and
when the compliance status of the device is passing, permitting access to the secured resource.

2. The compliance check system of claim 1, further comprising:
a memory to store a cookie holding result data after the compliance checker plug-in verifies compliance with the policy, such that a subsequent request for compliance validation is responded to using the cookie.

3. The compliance check system of claim 1, further comprising:
additional compliance checkers for compliance with other policies which may include one or more of installing current updates, having a password for access to the device, and other policies.

4. The compliance check system of claim 1, further comprising:
a connection to couple the device to a compliance checking server when the device does not have the compliance checker plug-in, the compliance checking server to install the plug-in on the device.

5. The compliance check system of claim 1, further comprising:
an encryption installer to install an encryption system compliant with the policy, when the compliance checker plug-in determines that the device is not compliant.

6. The compliance check system of claim 1, further comprising:
a browser on the device, the browser used to access a portal including an enforcement checker, which triggers the compliance checker plug-in.

7. The compliance check system of claim 1, wherein the compliance checker agent reads the copy of the file directly from a drive location, using a low level driver.

8. The compliance check system of claim 7, further comprising:
a buffer to pass the drive location, and to store the original file.

9. The compliance check system of claim 1, further comprising:
the compliance check system to analyze the encryption to determine that it meets security guidelines.

10. A method of providing device type and encryption application independent compliance checking for a device, the method comprising:
installing a compliance checker plug-in on a device to be validated;
receiving a request for compliance validation;
initiating the compliance validation in response to receiving the request;
for an encryption compliance validation:
  obtaining an original file to be written to a drive of the device;
  obtaining a copy of the file from the drive of the device, after storage;
  determining whether the original file and the copy of the file are identical;
  verifying an encryption compliance status of the device, based on data from the comparator;
when the compliance validation passes, enabling access to a secured resource; and
when the compliance status fails, redirecting the device to an installation site to install software for compliance.

11. The method of claim 10, further comprising:
storing a cookie holding result data after the compliance checker plug-in verifies compliance with the policy, such that a subsequent request for compliance validation is responded to using the cookie.

12. The method of claim 10, further comprising:
verifying compliance with other policies which may include one or more of installing current updates, having a password for access to the device, and other policies.

13. The method of claim 10, further comprising:
coupling the device to a compliance checking server when the device does not have the compliance checker plug-in, the compliance checking server to install the plug-in on the device.

14. The method of claim 10, further comprising:
automatically installing an encryption system compliant with the policy, when the compliance checker plug-in determines that the device is not compliant.

15. The method of claim 10, further comprising:
triggering the compliance checking by accessing a portal including an enforcement checker.

16. The method of claim 10, wherein the copy of the file is read directly from a drive location, using a low level driver.

17. The method of claim 16, wherein the drive location is retrieved from a buffer.

18. The method of claim 10, further comprising:
testing the copy of the file to verify that an encryption meets security guidelines.

19. A device type independent compliance checker to validate compliance of a device with a policy prior to providing access to privileged data for that device, the compliance checker comprising:
a compliance checker plug-in on the device, the compliance checker plug-in receiving a request for compliance validation when the device attempts to access a secured resource;
a compliance checker agent to initiate a compliance check in response to receiving the request, the compliance check including an encryption check, to verify that an encryption meets encryption standards; and
the compliance checker plug-in to determine a compliance level of the device, based on data from the compliance checker agent; and
when the compliance level is below 100%, a compliance verifier to determine the policy, wherein the policy determines whether to provide limited access to the secured resource or redirect the device to an installation site to install software for the 100% compliance level.

20. The compliance checker of claim 19, further comprising:

the device accessing the secured resource through a landing page, the landing page to trigger the compliance checker agent, and to redirect the device to download the compliance checker plug-in when it is not present on the device.

\* \* \* \* \*